United States Patent Office 3,391,216
Patented July 2, 1968

3,391,216
ISOMERIZATION PROCESS
Walter E. Breckoff, Royal Oak, Mich., assignor to Ethyl Corporation, New York, N.Y., a corporation of Virginia
No Drawing. Filed Apr. 16, 1965, Ser. No. 448,838
3 Claims. (Cl. 260—683.2)

ABSTRACT OF THE DISCLOSURE

A process for isomerizing an aliphatic α-olefin to the corresponding β-olefin using a Group VI–B hexacarbonyl as the catalyst.

---

This invention relates to olefin isomerization using a Group VI–B metal hexacarbonyl as a catalyst therefor. In preferred embodiments this invention relates to the catalytic isomerization of a terminal aliphatic olefin using chromium hexacarbonyl or molybdenum hexacarbonyl as a catalyst.

Various processes which isomerize terminal olefins to internal olefins are known in the art. However, in general, the prior art processes have many limitations such as excessive olefin cracking, undesirable olefin polymerization, excessive randomization or unfavorable economics. For example, it is known that palladium and platinum halides in combination with a halogenated straight chain organic acid solution of a halogen-containing salt of paladium or platinum can be used to isomerize olefins. This process is reported in U.S. 2,960,550. In U.S. 2,960,551 similar catalytic media are taught. These media consist essentially of a phosphorus oxychloride solution of a halogen containing a palladium or platinum salt. Chief disadvantages of these prior art processes are the expensive metal materials utilized, and the need for two types of materials in order to have the catalytic effect.

It is also known that olefins can be isomerized with iron carbonyl as a catalyst. This process has many decided disadvantages, chief among which is the extensive randomization of the product. The extensive randomization has a very deleterious effect in that it is extremely difficult to prepare any desired olefin isomer in high yield.

In contrast, this invention comprises the discovery that high yields of β-olefins can be prepared from α-olefins when a Group VI–B metal hexacarbonyl is employed as a catalyst.

An object of this invention is to provide a process for the isomerization of terminal olefins to internal olefins. A more particular object is to provide a process for the isomerization of straight chain terminal olefins to straight chain internal olefins which employs a Group VI–B metal hexacarbonyl as a catalyst. A further object is to provide a catalytic method for the isomerization of a terminal olefin which affords a high yield of β-olefin product. Additional objects will be apparent from the following detailed description and appended claims.

The objects of this invention are accomplished by providing a process for the preparation of an aliphatic β-olefin from an α-olefin, said process comprising contacting an aliphatic α-olefin with a catalytic quantity of a Group VI–B metal hexacarbonyl.

The process of this invention is advantageously employed in the conversion of straight chain α-olefins having from 12 to about 28 carbon atoms to the corresponding straight chain β-olefins. However, the process can also be used to isomerize lower olefins such as butene-1, pentene-1, hexene-1, octene-1 and the like. As pointed out above, a particular feature of this invention is the high yield of β-olefin afforded by the process.

The reaction temperature is not critical. It is desired that the reaction temperature affords a reasonable rate of isomerization but not be so high as to produce an untoward decomposition of the starting olefin or internal olefin products. Preferably the process is carried out at a temperature above about 100° C. Although temperatures as high as 300° C. or higher can be employed it is usually desirable that the temperature be within the range of from about 150 to about 225° C. The latter range is a highly preferred temperature range for this process. In many instances, especially when isomerizing olefins such as dodecene-1, tetradecene-1, hexadecene-1, and the like, a convenient temperature is the reflux temperature of the system.

The pressure at which the process is conducted is not critical. An atmospheric pressure of lower or higher pressures can be employed. In some instances, when it is desirable to employ a reaction temperature above the normal boiling point of a material within the reaction mixture, it is desirable to use superatmospheric pressures. Thus, pressures as high as 10 or 100 atmospheres or higher can be employed. A most preferred pressure range is from about ambient pressure to about 10 atmospheres. Under some circumstances it is desirable to carry out the process under a pressure of carbon monoxide. Thus, this reaction expedient is conveniently employed when it is desired to retard deterioration of the Group VI–B metal hexacarbonyl catalyst.

The reaction time is not a truly independent variable but is at least dependent to some extent on the other process conditions employed. In particular, higher temperatures usually afford a faster reaction time while, on the other hand, lower reaction temperatures tend to increase the time necessary for reaction. Furthermore, the reaction time depends to some extent on the amount of catalyst used for a given volume of olefin and to some extent on the specific metal hexacarbonyl employed as the catalyst. When carrying out the process as a batch operation, reaction times within the order of from about 10 minutes to about 20 hours are usually sufficient.

As pointed out above, a Group VI–B metal hexacarbonyl is employed as a catalyst in this process. The Group VI–B metal hexacarbonyls are chromium hexacarbonyl, molybdenum hexacarbonyl and tungsten hexacarbonyl. Of these, chromium hexacarbonyl and the molybdenum compound are preferred.

A catalytic quantity of a Group VI–B metal hexacarbonyl is employed in the process. Relatively small amounts of the metal hexacarbonyls are sufficient. A preferred concentration range is from about 0.01 to about 10 weight percent based on the weight of the terminal olefin to be isomerized. A highly preferred concentration range is from about 0.03 weight percent to 1 weight percent while a very highly preferred range is from about 0.05 percent to 0.1 percent. It is not necessary that only one Group VI–B metal hexacarbonyl be employed as a catalyst. Mixtures of two or all three hexacarbonyls of this type can be used if desired.

The Group VI–B metal hexacarbonyl may be used alone or it may be used in conjunction with a support. In the latter instance the Group VI–B metal hexacarbonyl may be dispersed on a catalytic support. Suitable supports are the zeolites such as analcine and natrolite. Other supports which may be employed include charcoal, alumina, diatomaceous earth, bentonite, firebrick, kaolin, ground glass, silicon carbide, silicon dioxide, kieselguhr, and the like. The catalyst may be employed in a finely divided form. Similarly, it can be used in particular forms such as pellets, tablets, etc. In addition, this catalyst may be dispersed on a metal or ceramic screen.

The process of this invention is carried out by contacting the olefin to be isomerized with the catalyst. It is not necessary to include other ingredients within the reaction zone. However, in some instances it is desirable to do so. For example, it has already been mentioned that under certain circumstances it may be desirable to use an atmosphere consisting in whole or in part of carbon monoxide and/or a catalytic support. In addition, solvents which are inert under the process conditions employed can be used in this process. Typical solvents of this type are paraffinic materials such as hexane, dodecane and mixtures thereof such as ligroin, kerosene, No. 9 oil and the like.

The process of this invention may be carried out in air or in an inert atmosphere. When it is desired to use an inert atmosphere, nitrogen is the gas of choice for economical reasons. However, other inert gases such as neon, argon, krypton and the like can be employed if desired. The process may be carried out in the presence of ultraviolet radiation.

The process of this invention can be carried out as a batch process or as a continuous operation. In a continuous process, an olefin, either in vapor or in liquid phase, may be contacted with the catalyst, but for practical reasons, liquid phase operations are preferred. When carrying out the process of this invention as a batch operation, it is preferred that a liquid phase be present. Thus, dodecene-1 can be isomerized by refluxing a mixture of dodecene-1 and catalyst at atmospheric pressure. Similarly, butene-1 can be isomerized in a batch operation by contacting it with a catalyst at a pressure under which the terminal olefin is a liquid. Alternatively, butene-1 (or any terminal olefin that is gaseous at the reaction temperature) can be isomerized according to the process of this invention by bubbling the gaseous olefin through a liquid reaction medium containing the catalyst.

When this process is carried out using olefin vapors and a continuous process, an inert gas, preferably nitrogen, is advantageously used as a carrier for the olefin that is being passed through the catalyst bed. In such a process the amount of nitrogen used as compared to the amount of olefin should be such that the volume of nitrogen to olefin be within the range of 1:1 to 1000:1.

In a continuous process, occasionally a single pass of an olefin through the reaction column might not yield the desired degree of isomerization. In such cases, the partially isomerized olefin may be recycled in the same manner as the fresh olefin through the reaction column to produce the desired degree of isomerization.

When the process of this invention is a continuous process, an additional variable of space velocity is introduced. Space velocity may be defined by the following relationship:

$$\text{Space velocity (s.v.)} = \frac{\text{ml. olefin injected/ml. catalyst}}{\text{hours}}$$

The above formula for calculating space velocity holds whether the olefin employed is in liquid or gas phase. The value for space velocity, however, will be substantially different when the olefin is in one or the other physical state. For example, when the olefin is in a liquid state, space velocity generally is in the range of from 0.1 to about 100, and more preferably, from 0.5 to about 10. On the other hand, when the olefin is in a gaseous state, space velocity is in the range of from about 50 to about 500. The reason for the difference in the values for space velocity is that there is substantially much less olefin in each milliliter of olefin in gaseous state than in each milliliter of olefin in a liquid state.

Space velocity is thus a measure of the speed with which an olefin is passed through the reaction tube containing the catalyst bed. Space velocity in a continuous process, similarly as the reaction time in a batch process, is not a directly independent variable. It depends on the reaction temperature, the activity of a particular catalyst employed, and the degree of isomerization desired. It will be seen then that in order to achieve a given amount of isomerization, the space velocity generally will be different for different catalysts even if all other variables remain constant.

From the above discussion, it is clear that for optimum results the space velocity and the nitrogen flow must be determined for every isomerization when a different catalyst or a different olefin is employed. Not only the activity of the catalyst and the reaction temperature must be considered, but also the degree of isomerization desired, since, generally, the higher the degree of isomerization, the more time is required to attain it. Generally speaking, however, space velocity for liquid olefins will be in the range of from 0.1 to about 100, and preferably from 0.5 to about 10, and for gaseous olefins from about 50 to about 500.

As pointed out above the process of this invention is particularly useful in the isomerization of $\alpha$-olefins having from 12 to 28 carbon atoms. Illustrative but non-limiting examples of olefins of this type include dodecene-1, hexadecene-1, octadecene-1, eicosene-1, docosene-1, pentacosene-1, octacosene-1, and the like. It is preferred that these olefins be straight chain olefins. In other words, materials like n-hexadecene-1, n-docosene-1, and the like be isomerized by this process. Similarly, the normal or straight chain isomers of the olefins above mentioned are also preferred starting materials. If desired, mixtures of olefins may be isomerized by this process.

The products of this invention can be separated from the reaction mixture by any method known in the art. Suitable separation techniques include distillation, adsorption chromatography, gas chromatography, and the like.

The following examples serve to illustrate the process of this invention but do not limit it. All parts are by weight unless otherwise noted.

Example I

A reaction vessel equipped with a side arm is charged with dodecene-1 and 1 weight percent (based on dodecene-1) of chromium hexacarbonyl. After refluxing the resultant mixture under nitrogen for one and one-half hours, the starting material is converted to a mixture of dodecenes containing at least 80 percent dodecene-2.

Example II

When dodecene-1 is refluxed for one-half hour in the presence of 1 weight percent of molybdenum hexacarbonyl it is converted to a mixture of olefins containing at least 70 percent $\beta$-olefin (that is dodecene-2, $\beta$-dodecene) and containing not more than 5 percent other internal olefins.

Example III

The process of Example I is repeated except that octacosene-1 is employed in place of the dodecene-1. Similar results are obtained when n-octadecene-1, n-nonadecene-1 and eicosene are employed using tungsten hexacarbonyl as a catalyst.

Example IV

The process of Example II is repeated except that hexadecene-1 is substituted for the dodecene-1. Similar results are obtained.

Similar results are obtained when chromium hexacarbonyl or molybdenum hexacarbonyl is used in an amount from 0.1 weight percent to 5.0 weight percent based on the amount of olefin, e.g., tetradecene-1 employed in the process.

Example V

Dodecene-1, 57 parts, and chromium hexacarbonyl, 0.75 part, were charged to a reaction vessel and heated to reflux for 1.5 hours. Vapor phase chromatographic analysis demonstrated that the product liquid contained 77.5 volume percent dodecene-2, 9.7 volume percent dodecene-1, 9.4 volume percent internal olefins (other than dodecene-2) and 2.1 volume percent paraffinic material.

Example VI

Dodecene-1, 57 parts, and molybdenum hexacarbonyl, 0.75 part, were charged to a reaction vessel and heated to reflux for 15 minutes. Vapor phase chromatographic analysis demonstrated that the product liquid contained 58.3 volume percent dodecene-2, 35 volume percent dodecene-1, 2.9 volume percent internal olefins (other than dodecene-2), 1.5 volume percent vinylidine olefin material and 2.1 volume percent paraffin material.

Example VII

Tetradecene-1, 100 parts, and molybdenum hexacarbonyl, one-tenth part, are heated to 100° C. for one-half hour while the reaction is irradiated with ultraviolet light. A good yield of tetradecene-2 is prepared.

The internal olefins produced by the process of this invention are well known compounds and have the many utilities which are known for them. For example, they are valuable chemical intermediates and can be transformed into acids by an ozonolysis reaction. Thus, for example, tetradecene-2 can be reacted with ozone to yield lauric acid, a detergent range acid. Similarly, the other internal olefins produced by this process can be ozonized to yield the corresponding acids. When ozonizing the products of the process of this invention, the reaction is generally carried out at a low temperature; e.g., from −50 to about 10° C. After the ozonization reaction is completed, the resultant reaction mixture is usually treated with another oxidant such as air or oxygen to obtain the product acid. The secondary oxidation is usually carried out at a temperature within the range of 20 to 90° C. Solvents which can be employed in the ozonolysis of olefins include inert solvents such as chloroform and carbon tetrachloride or hydroxylic solvents such as methanol and acetic acid.

Having fully described the process of this invention, the products produced thereby and their many utilities, it is desired that this invention be limited only by the lawful scope of the appended claims.

I claim:

1. A process for the preparation of a straight-chain β-olefin, said process consisting essentially of contacting a straight-chain α-olefin having from 4 to 28 carbon atoms with a catalytic quantity of a catalyst consisting essentially of chromium hexacarbonyl.

2. The process of claim 1 being carried out at a temperature within the range of from about 100° to 225° C.

3. The process of claim 1 wherein (a) the α-olefin is dodecene-1 and (b) the process is carried out at the reflux temperature.

References Cited

UNITED STATES PATENTS

| | | | |
|---|---|---|---|
| 3,083,246 | 3/1963 | Holzman et al. | 260—683.15 |
| 3,310,598 | 3/1967 | Noddings et al. | 260—683.2 |
| 3,313,858 | 4/1967 | Clark | 260—666 |

FOREIGN PATENTS 633,418  12/1963  Belgium.

OTHER REFERENCES

Asinger et al.: Chem. Ber., vol. 98, pages 372–8, 1965.
Fischer et al.: Chemical Abstracts, vol. 53, 21, 341d, 1959.

DELBERT E. GANTZ, *Primary Examiner.*

R. H. SHUBERT, V. O'KEEFE, *Assistant Examiners.*